United States Patent [19]

Waugh

[11] 4,226,125

[45] Oct. 7, 1980

[54] DIGITAL PRESSURE SENSOR SYSTEM WITH TEMPERATURE COMPENSATION

[75] Inventor: John B. S. Waugh, Mountain Lakes, N.J.

[73] Assignee: The Singer Company, Stamford, Conn.

[21] Appl. No.: 61,162

[22] Filed: Jul. 26, 1979

[51] Int. Cl.³ .................... G01L 19/04; G01L 9/06
[52] U.S. Cl. ........................... 73/708; 73/721; 73/727
[58] Field of Search ............ 73/708, 720, 721, 726, 73/727; 357/26; 307/310

[56] References Cited

U.S. PATENT DOCUMENTS

| | | | |
|---|---|---|---|
| 3,566,162 | 2/1971 | Warrender | 307/310 |
| 3,841,150 | 10/1974 | Pearson | 73/708 |
| 3,899,695 | 8/1975 | Solomon et al. | 357/26 |
| 4,163,396 | 8/1979 | Waugh | 73/721 |

*Primary Examiner*—Donald O. Woodiel
*Attorney, Agent, or Firm*—David L. Davis; Robert E. Smith; Edward L. Bell

[57] ABSTRACT

A digital pressure sensor system is disclosed wherein a pressure differential causes the resistance of two equal, diffused piezoresistors to change by equal but opposite amounts. Temperature compensation is achieved by using the temperature dependency of the piezoresistors in combination with a temperature reference resistor to establish a plurality of time durations of a distinct voltage level. The ratio of these time durations forms a temperature compensation factor which may be used to compensate the pressure reading.

9 Claims, 1 Drawing Figure

DIGITAL PRESSURE SENSOR SYSTEM WITH TEMPERATURE COMPENSATION

DESCRIPTION

BACKGROUND OF THE INVENTION

Integrated circuit pressure transducers have been developed by utilizing equal resistive value piezoresistive elements on a single crystal silicon diaphragm. The operation of these devices is such that a change in pressure develops a strain in the silicon diaphragm which is effectively magnified by the diaphragm to vary the resistance of the piezoresistive elements.

In general, prior art pressure transducers used piezoresistors with relatively low resistances to minimize the effect of their temperature dependency. However, this practice adversely affects the pressure sensitivity of the piezoresistors. This invention allows the use of heretofore undesirable piezoresistors having a high temperature dependency along with a high sensitivity to pressure changes. This is achieved by the present invention by compensating for the ambient temperature to provide a pressure sensor having a high degree of accuracy along with a high pressure sensitivity.

SUMMARY OF THE INVENTION

One object of this invention is to provide a digital pressure sensor system with temperature compensation.

Another object of this invention is to use previously undesirable piezoresistors having a high temperature dependency in a pressure sensor system.

Another object of this invention is to provide a digital pressure sensor system having a high pressure sensitivity.

These objects are achieved in a pressure sensor system including a timing circuit having an input means and an output means. The timing circuit is capable of producing on the output means a first output level and a second output level; each of the output levels having a time duration responsive to signals on the input means. A first piezoresistive element is coupled to the timing circuit input means such that the magnitude thereof determines a first time duration of the first output level; the first piezoresistive element having the characteristic that the magnitude thereof increases as the ambient pressure increases. A second piezoresistive element is coupled to the timing circuit input means such that the magnitude thereof determines a second time duration of the first output level, the second piezoresistive element having the characteristic that the magnitude thereof decreases as the ambient pressure increases. A third resistive element is coupled to the timing circuit input means such that the magnitude thereof determines a third time duration of the first output level; the third resistive element having a temperature dependency significantly less than the temperature dependencies of the first and second piezoresistive elements. Means are provided for selectively energizing the first, second and third resistive elements separately for establishing signals on the timing circuit input means relating to the first, second and third time durations, respectively, of the first output level, and for selectively energizing the first and second resistive elements simultaneously for establishing a signal on the timing circuit input means relating to a fourth time duration of the first output level. Means are also provided for compiling and analyzing the first, second, third and fourth time durations of the first output level such that a temperature compensated pressure reading may be obtained.

DESCRIPTION OF THE DRAWINGS

With the above and additional object and advantages in mind as will hereinafter appear, the invention will be described with reference to the attached drawing in which.

DESCRIPTION OF THE PREFERRED EMBODIMENT

Figure 1:
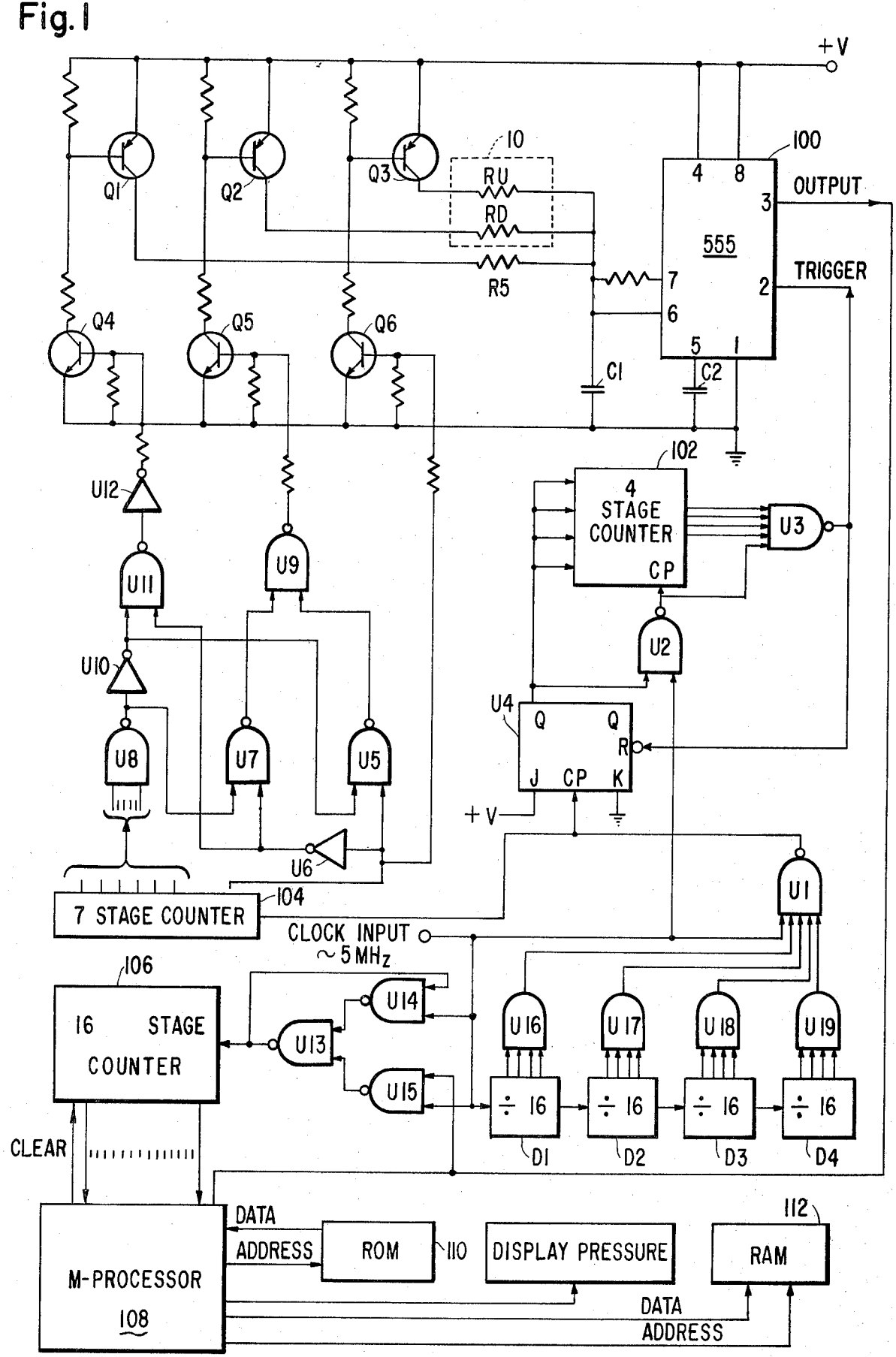
FIG. 1 is a combined schematic and block diagram illustration of a preferred embodiment of the present invention.

A digital readout pressure sensor is disclosed in U.S. Pat. Application Ser. No. 826,593 filed Aug. 22, 1977, now U.S. Pat. No. 4,163,396, and assigned to the same assignee as the present invention and is incorporated herein by reference. In that application, a timing ratio r was defined as the difference in magnitude of the piezoresistors $R_1$ and $R_2$ in a piezoresistive pressure sensor over the sum thereof:

$$r = \frac{R_1 - R_2}{R_1 + R_2} \qquad (1)$$

It was assumed that the change in resistance of the resistors $R_1$ and $R_2$ from a nominal resistance $R_0$ was linear:

$$R_1 = R_{01}(1 + \alpha P) \qquad (2)$$

$$R_2 = R_{02}(1 - \alpha P) \qquad (3)$$

where
$P$ = pressure and
$\alpha$ = the fractional change in sensor resistance per unit change in pressure. Therefore, the ratio $r$ was shown to be:

$$r \approx \frac{\Delta R}{\Sigma R} + \alpha P \qquad (4)$$

For the purpose of the present invention, however, a new timing ratio, $r_p^*$ is defined as:

$$r_p^* = \frac{R_1}{R_2} - \frac{R_2}{R_1} \qquad (5)$$

With respect to the piezoresistors $R_1$ and $R_2$ rather than assuming linearity, a quadratic pressure term is inserted into the resistance expressions to increase the accuracy of the approximation.

$$R_1 = R_{01}(1 + \alpha P + \beta P^2) \qquad (6)$$

$$R_2 = R_{02}(1 - \alpha P + \beta P^2) \qquad (7)$$

Where $\alpha$ is the fractional change of sensor resistance ($R_1$ and $R_2$) per unit change in pressure at zero applied pressure and $\beta$ is half the rate of change of $\alpha$ per unit change in pressure and thus measures the deviation from a straight line relationship. Accordingly, for a linear sensor device $\beta$ would equal zero.

In the case where $R_{01} = R_{02} = R_0$ $$r_p^* = \frac{1 + \alpha P + \beta P^2}{1 - \alpha P + \beta P^2} - \frac{1 - \alpha P + \beta P^2}{1 + \alpha P + \beta P^2} \quad (8)$$

$$= 4\alpha P \left[ 1 + P^2 \frac{(\alpha^2 - \beta)}{(1 + \beta P^2)} \right] \quad (9)$$

When expanded equation (9) becomes $$r_p^* = 4\alpha P + 4\alpha P^3 (\alpha^2 - \beta/1 + \beta P^2) \quad$$

Since $1 >> \alpha >> \beta$ the expression reduces to $$r_p^* \delta 4\alpha P \quad (10)$$

and is good to a high degree of accuracy.

In view of the cancellation of the quadratic non-linearity in the variation of the piezoresistance as expressed in terms of the applied pressure, the gage calibration is thus better made in terms of this ratio of the time intervals $T_1$ and $T_2$ where $T_1$ and $T_2$ are the time durations of a timer output (100 in FIG. 1) produced by the piezoresistances $R_1$ and $R_2$ to provide the following equation.

$$r_p^* = \frac{T_1}{T_2} - \frac{T_2}{T_1} \quad (11)$$

The calibration procedure now becomes one of measuring $T_1$ and $T_2$ as a function of pressure over the temperature range of interest and fitting the data points to a quadratic function:

$$P = P_0 + k_1 r_p + k_2 r_p^2 \quad (12)$$

In the above equation and hereinafter the asterisk (*) is dropped from the term $r_p$.

Where $P_0$, $k_1$ and $k_2$ are the coefficients of the quadratic relationship between the pressure $P$ and the pressure dependent sensor variable $r_p$. $P_0$ represents the intercept of the curve of P versus $r_p$ with the line $r_p = 0$. $k_1$ is the slope of this curve at the point where $r_p = 0$ and $k_2$ is the rate of change of slope at any point, the rate being constant for a quadratic or parabolic curve.

Since $P_0$, $k_1$ and $k_2$ are found to be functions of temperature, the subscript t is added and equation (12) rewritten as $$P = P_{0t} + k_{1t} r_{pt} + k_{2t} r_{pt}^2 \quad (13)$$

The subscript 't' refers to temperature and the subscript 'p' shows that the ratio $r_{pt}$ is associated with the pressure change aat a temperature, t. When the above-mentioned calibration procedure is carried out over the applicable temperature range, it has been found both analytically and experimentally that $P_{0t}$, $k_{1t}$ and $k_{2t}$ may also be expressed as quadratic functions of temperature or of a temperature dependent parameter $r_t$ derived similarly to $r_p$ by using a temperature rather than a pressure sensor.

$$P_{0t} = P_{00} + P_{01} r_t + P_{02} r_t^2 \quad (14)$$

$$k_{1t} = k_{10} + k_{11} r_t + k_{12} r_t^2 \quad (15)$$

$$k_{2t} = k_{20} + k_{21} r_t + k_{22} r_t^2 \quad (16)$$

The values of the constants in these three equations can be obtained by measuring the actual $r_{pt}$ and $r_t$ at three known values of pressure at each of three known temperatures and solving the resultant set of nine equations.

$$P_1 = P_{0t1} + k_{1t1} r_{p1t1} + k_{2t1} r_{p1t1}^2 \quad (17)$$

$$P_2 = P_{0t1} + k_{1t1} r_{p2t1} + k_{2t1} r_{p2t1}^2 \quad (18)$$

$$P_3 = P_{0t1} + k_{1t1} r_{p3t1} + k_{2t1} r_{p3t1}^2 \quad (19)$$

Solving for $P_{0t1}$ $k_{1t1}$ and $k_{2t1}$:

$$P_{0t1} = \frac{\begin{vmatrix} P_1 & r_{p1t1} & r_{p1t1}^2 \\ P_2 & r_{p2t1} & r_{p2t1}^2 \\ P_3 & r_{p3t1} & r_{p3t1}^2 \end{vmatrix}}{\Delta r_1} \quad (20)$$

$$k_{1t1} = \frac{\begin{vmatrix} 1 & P_1 & r_{p1t1}^2 \\ 1 & P_2 & r_{p2t1}^2 \\ 1 & P_3 & r_{p3t1}^2 \end{vmatrix}}{\Delta r_1} \quad (21)$$

$$k_{2t1} = \frac{\begin{vmatrix} 1 & r_{p1t1} & P_1 \\ 1 & r_{p2t1} & P_2 \\ 1 & r_{p3t1} & P_3 \end{vmatrix}}{\Delta r_1} \quad (22)$$

where $\Delta r_1 =$ $$\begin{vmatrix} 1 & r_{p1t1} & r_{p1t1}^2 \\ 1 & r_{p2t1} & r_{p3t1}^2 \\ 1 & r_{p3t1} & r_{p3t1}^2 \end{vmatrix} \quad (23)$$

Similarly:

$$P_{0t2} = \frac{\begin{vmatrix} P_1 & r_{p1t2} & r_{p1t2}^2 \\ P_2 & r_{p2t2} & r_{p2t2}^2 \\ P_3 & r_{p3t2} & r_{p3t2}^2 \end{vmatrix}}{\Delta r_2} \quad (24)$$

$$k_{1t2} = \frac{\begin{vmatrix} 1 & P_1 & r_{p1t2}^2 \\ 1 & P_2 & r_{p2t2}^2 \\ 1 & P_3 & r_{p3t2}^2 \end{vmatrix}}{\Delta r_2} \quad (25)$$

$$k_{2t2} = \frac{\begin{vmatrix} 1 & r_{p1t2} & P_1 \\ 1 & r_{p2t2} & P_2 \\ 1 & r_{p2t2}^2 & P_3 \end{vmatrix}}{\Delta r_2} \quad (26)$$

Where: $\Delta r_2 =$ $$\begin{vmatrix} 1 & r_{p1t2} & r_{p1t2}^2 \\ 1 & r_{p2t2} & r_{p2t2}^2 \\ 1 & r_{p3t2} & r_{p3t2}^2 \end{vmatrix} \quad (27)$$

Similarly:

$$P_{0t3} = \frac{\begin{vmatrix} P_1 & r_{p1t3} & r_{p1t3}^2 \\ P_2 & r_{p2t3} & r_{p2t3}^2 \\ P_3 & r_{p3t3} & r_{p3t3}^2 \end{vmatrix}}{\Delta r_3} \quad (28)$$

$$k_{1t3} = \frac{\begin{vmatrix} 1 & P_1 & r_{p1t3}^2 \\ 1 & P_2 & r_{p2t3}^2 \\ 1 & P_3 & r_{p3t3}^2 \end{vmatrix}}{\Delta r_3} \quad (29)$$

$$k_{2t3} = \frac{\begin{vmatrix} 1 & r_{p1t3} & P_1 \\ 1 & r_{p2t3} & P_2 \\ 1 & r_{p3t3}^2 & P_3 \end{vmatrix}}{\Delta r_3} \quad (30)$$

Where $\Delta r_3 =$ $$\begin{vmatrix} 1 & r_{p1t3} & r_{p1t3}^2 \\ 1 & r_{p2t3} & r_{p2t3}^2 \\ 1 & r_{p3t3} & r_{p3t3}^2 \end{vmatrix} \quad (31)$$

From the three sets of $P_{0tn}$, $k_{1tn}$, $k_{2t}$ where $n=1, 2$ or 3, and the corresponding values of $r_t$, $P_{00}$, $k_{10}$ and $k_{20}$ may be derived using equations (14), (15) and (16) above, over the three temperatures $t_1$, $t_2$ and $t_3$. For example the pressure set of equations to be solved are:

$$P_{0t1} = P_{00} + a_{1p} r_{t1} + a_{2p} r_{t1}^2 \quad (32)$$
$$P_{0t2} = P_{00} + a_{1p} r_{t2} + a_{2p} r_{t2}^2 \quad (33)$$
$$P_{0t3} = P_{00} + a_{1p} r_{t3} + a_{2p} r_{t2}^2 \quad (34)$$

From which:

$$P_{00} = \frac{\begin{vmatrix} P_{0t1} & r_{t1} & r_{t1}^2 \\ P_{0t2} & r_{t2} & r_{t2}^2 \\ P_{0t3} & r_{t3} & r_{t3}^2 \end{vmatrix}}{\Delta p} \quad (35)$$

$$a_{1p} = \frac{\begin{vmatrix} 1 & P_{0t1} & r_{t1}^2 \\ 1 & P_{0t2} & r_{t2}^2 \\ 1 & P_{0t3} & r_{t3}^2 \end{vmatrix}}{\Delta p} \quad (36)$$

$$a_{2p} = \frac{\begin{vmatrix} 1 & r_{t1} & P_{0t1} \\ 1 & r_{t2} & P_{0t2} \\ 1 & r_{t3} & P_{0t3} \end{vmatrix}}{\Delta p} \quad (37)$$

Where $\Delta p =$ $$\begin{vmatrix} 1 & r_{t1} & r_{t1}^2 \\ 1 & r_{t2} & r_{t2}^2 \\ 1 & r_{t3} & r_{t3}^2 \end{vmatrix} \quad (38)$$

Similarly:

$$k_{10} = \frac{\begin{vmatrix} k_{1t1} & r_{t1} & r_{t1}^2 \\ k_{1t2} & r_{t2} & r_{t2}^2 \\ k_{1t3} & r_{t3} & r_{t3}^2 \end{vmatrix}}{\Delta t} \quad (39)$$

$$k_{11} = \frac{\begin{vmatrix} 1 & k_{1t1} & r_{t1}^2 \\ 1 & k_{1t2} & r_{t2}^2 \\ 1 & k_{1t3} & r_{t3}^2 \end{vmatrix}}{\Delta t} \quad (40)$$

$$k_{12} = \frac{\begin{vmatrix} 1 & r_{t1} & k_{1t1} \\ 1 & r_{t2} & k_{1t2} \\ 1 & r_{t3} & k_{1t3} \end{vmatrix}}{\Delta t} \quad (41)$$

$$k_{20} = \frac{\begin{vmatrix} k_{2t1} & r_{t1} & r_{t1}^2 \\ k_{2t2} & r_{t2} & r_{t2}^2 \\ k_{2t3} & r_{t3} & r_{t3}^2 \end{vmatrix}}{\Delta t} \quad (42)$$

$$k_{21} = \frac{\begin{vmatrix} 1 & k_{2t1} & r_{t1}^2 \\ 1 & k_{2t2} & r_{t2}^2 \\ 1 & k_{2t3} & r_{t3}^2 \end{vmatrix}}{\Delta t} \quad (43)$$

$$k_{22} = \frac{\begin{vmatrix} 1 & r_{t1} & k_{2t1} \\ 1 & r_{t2} & k_{2t2} \\ 1 & r_{t3} & k_{2t3} \end{vmatrix}}{\Delta t} \quad (44)$$

Where $\Delta t =$ $$\begin{vmatrix} 1 & r_{t1} & r_{t1}^2 \\ 1 & r_{t2} & r_{t2}^2 \\ 1 & r_{t3} & r_{t3}^2 \end{vmatrix} \quad (45)$$

Thus the values for $P_{00}$, $a_{1p}$, $a_{2p}$, $k_{10}$, $k_{11}$, $k_{12}$, $k_{20}$, $k_{21}$, $k_{22}$ are obtained in terms of the known (i.e. measured) applied pressures at the known temperatures as determined by the $r_t$ values. Therefore, equations (14), (15), and (16) may be applied to equation (13) to setup an equation for an unknown pressure P given $r_t$ and $r_{pt}$ as measured quantities.

$$P = (P_{00} + a_{1p}r_t + a_{2p}r_t^2) + (k_{10} + k_{11}r_t + k_{12}r_t^2)r_{pt} + (k_{20} + k_{21}r_t + k_{22}r_t^2)r_{pt}^2 \quad (46)$$

With respect to the present embodiment of the invention, the novel concept disclosed herein rests on the fact that the parallel combination of two nominally equal resistors that undergo equal and opposite magnitude changes is independent of the magnitude of that change to the second order. By defining the two piezoresistors $R_1$ and $R_2$ as follows:

$$R_1 = R_0(1 + \Delta R/R_0) \text{ tm} \quad (47)$$

$$R_2 = R_0(1 - \Delta R/R_0) \quad (48)$$

The value of $R_1$ and $R_2$ in parallel is:

$$R_p = \frac{R_0}{2} \left[ 1 + \frac{\Delta R}{R_0} \right] \left[ 1 - \frac{\Delta R}{R_0} \right] \quad (49)$$

$$= \frac{R_0}{2} \left[ 1 - \left( \frac{\Delta R}{R_0} \right)^2 \right] \quad (50)$$

Since the maximum value of the pressure induced change $\Delta R/R_0$ is approximately 1%; $(\Delta R/R_0)^2$ is about $10^{-4}$ which is negligible compared to the temperature dependent resistance change of nearly two to one over the operating temperature range.

FIG. 1 shows a schematic arrangement of the circuitry required to implement the present inventive concept. Two piezoresistive pressure elements on a pressure sensor 10 are represented by resistors $R_U$, $R_D$, the subscripts U and D being indicative of the upward and downward variations of the piezoresistive elements in response to a positive pressure change. A resistor R5 external of the sensor 10 is used as a reference and has a temperature coefficient significantly less than that of the piezoresistors $R_U$ and $R_D$: for example, at least a factor of 100 less. Transistor pairs Q1, Q4; Q2, Q5; Q3, Q6; driven by associated circuit logic, select four distinct combinations of $R_U$, $R_D$, $R_S$, namely:

$R_U$ alone;
$R_D$ alone;
$R_S$ alone; and
$R_U$ and $R_D$ simultaneously, i.e., in parallel, without $R_S$.

The selected resistor or resistor combination in conjunction with a capacitor C1 controls the duration of a ramp developed at the input to a 555 timer integrated circuit 100 described in the copending application described hereinabove. The 555 Timer circuit 100 is arranged in a monostable configuration such that an output timing pulse, having a duration equivalent to the duration of the input ramp, is initiated by applying a negative trigger pulse to the trigger input thereof after the logic circuit has selected the appropriate timing resistor.

The control logic is derived from a clock input, shown only for illustrative purposes as five megahertz. The clock input is divided down by a series of synchronous dividers D1, D2, D3 and D4. Gates U16, U17, U18, U19 and U1 generate a single clock pulse every $2^{16}$ input clock cycles. The output of U1 sets u4, releasing the reset on a four-stage counter 102 which then counts the divided down clock pulses via the now-enabled gate U2. On the next rising clock pulse out of gate u2 after the count in counter 102 reaches 15, gate U3 output becomes false, i.e., goes to zero. Bistable gate U4 is now reset, its Q output goes low, resetting the counter 102, and the negative-going edge of the gate U3 output triggers the 555 timer circuit 100. The delay while the counter 102 counts up to fifteen is inserted in order to allow the piezoresistor circuit to stabilize after each successive resistor has been selected.

The sequencing of the timing resistors is accomplished by U5 through U12 and a seven-stage counter 104. The combination of the counter 1C4 and the gates U5 through U12 first selects the resistor RS alone for one cycle, then selects the piezoresistor $R_U$ and $R_D$ in parallel, then alternately selects the piezoresistors $R_U$ and $R_D$ for 126 cycles (63 times each).

The duration of the pulses developed by the 555 timer circuit 100 is measured by gating clock pulses into a sixteen-stage counter 106 via gates U13, U14 and U15. The output from the 555 timer circuit 100 interrupts a microprocessor 108 which then reads the contents of the counter 106 and computes and displays the pressure (and temperature) using the constants, which have been previously determined and entered into a read-only-memory (ROM) 110, in the algorithms described above, which also have been entered into the read only memory (110).

Considering the above, $r_p$ may be determined using the previously defined ratio:

$$r_p = \frac{T_1}{T_2} - \frac{T_2}{T_1} \quad (11)$$

and $r_t$ may be determined by defining a new ratio:

$$r_t = \frac{T_3}{T_{12}} - \frac{2T_3}{R_0(1 + \alpha t)} \quad (51)$$

Where:
$T_1$ = Pulse duration time due to $R_U$ alone;
$T_2$ = Pulse duration time due to $R_D$ alone;
$T_3$ = Pulse duration time due to R5 alone;
$T_{12}$ = Pulse duration time due to parallel combination of $R_U$ and $R_D$.

Time $T_3$ is independent of temperature while the time $T_{12}$ shows the temperature dependent resistance change of the parallel piezoresistors $R_U$ and $R_D R_0(1+\alpha t)\frac{1}{2}$. These ratios may then be used to calibrate the device as discussed above, and in equation (46) to obtain the compensated pressure reading.

If a temperature readout is also desired, the set or $r_t$ values and the corresponding absolute temperature values, as depicted above, may be used to find the constants that fit the temperature to a quadratic equation:

$$t = t_0 + a_{1t}r_{rt} + a_{2t}r_t^2 \quad (52)$$

This algorithm for computing temperature uses the same computational subroutine as used for the $P_{0t}$, $k_{1t}$, $k_{2t}$ algorithms and hence only requires the addition of three storage locations in the system memory.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit of the invention are intended to be included within the scope of the appended claims.

I claim:

1. A digital pressure sensor system with temperature compensation comprising:

a timing circuit having an input means and an output means, said timing circuit being capable of producing on said output means a first output level and a second output level, each of said output levels having a time duration responsive to signals on said input means;

a first resistive element coupled to said timing circuit input means wherein the magnitude thereof determines a first time duration of said first output level, said first resistive element having the characteristic wherein the magnitude thereof increases as the ambient pressure there around increases, said first resistive element also being temperature dependent;

a second resistive element coupled to said timing circuit input means wherein the magnitude thereof determines a second time duration of said first output level, said second resistive element having the characteristic wherein the magnitude thereof decreases as the ambient pressure there around increases, said second resistive element also being temperature dependent;

a third resistive element coupled to said timing circuit input means wherein the magnitude thereof determines a third time duration of said first output level, said third resistive element having a temperature dependency significantly less than the temperature dependencies of said first and said second resistive elements;

means both for selectively energizing said first, second and third resistive elements separately for establishing signals on said timing circuit input means relating to said first, said second and said third time durations respectively, of said first output level, and for selectively energizing said first and said second resistive elements simultaneously for establishing a signal on said timing circuit input means relating to a fourth time duration of said first output level; and means for compiling and analyzing said first, second, third and fourth time durations of said first output level, wherein said first and second time durations of said first output level relate to the ambient pressure and said third and fourth time durations of said first output level relate to the ambient temperature, whereeby a pressure reading may be obtained from said pressure sensor system having the ambient temperature compensated therefor.

2. The digital pressure sensor system as set forth in claim 1 wherein the magnitude of the first resistive element is substantially equal to the magnitude of the second resistive element absent a pressure differential on said pressure sensor.

3. The digital pressure sensor system as set forth in claim 1 wherein said first and said second resistive elements are piezoresistive.

4. The digital pressure sensor system as set forth in claim 1 wherein said compiling and analyzing means includes a ratio $r_p$, said ratio $r_p$ being the ratio of said first time duration to said second time duration minus the reciprocal thereof, said ratio $r_p$ being indicative of the ambient pressure.

5. The digital pressure sensor system as set forth in claim 4 wherein said coupling and analyzing means further includes a ratio $r_t$, said ratio $r_t$ being the ratio of said third time duration to said fourth time duration, said ratio $r_t$ being indicative of the ambient temperature.

6. The digital pressure sensor system as set forth in claim 5 wherein the ratio $r_t$ is a quadratic function of temperature.

7. The digital pressure sensor system as set forth in claim 4 wherein the ratio $r_p$ is a quadratic function of pressure.

8. The digital pressure sensor system as set forth in claim 2 wherein the change in magnitude of said first and said second resistive elements is a quadratic function of pressure.

9. The digital pressure sensor system as set forth in claim 1 wherein the temperature dependence of said third resistive element is a factor of at least 100 less than that of said first or said second resistive elements.

* * * * *